(12) United States Patent
Smalley et al.

(10) Patent No.: US 10,108,146 B2
(45) Date of Patent: Oct. 23, 2018

(54) ANISOTROPIC LEAKY-MODE MODULATOR FOR HOLOGRAPHIC VIDEO DISPLAYS

(71) Applicants: Daniel E. Smalley, Provo, UT (US); V. Michael Bove, Jr., Wrentham, MA (US); Quinn Y. J. Smithwick, Pasadena, CA (US)

(72) Inventors: Daniel E. Smalley, Provo, UT (US); V. Michael Bove, Jr., Wrentham, MA (US); Quinn Y. J. Smithwick, Pasadena, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 887 days.

(21) Appl. No.: 14/213,333

(22) Filed: Mar. 14, 2014

(65) Prior Publication Data

US 2014/0300694 A1    Oct. 9, 2014

Related U.S. Application Data

(63) Continuation-in-part of application No. 13/437,850, filed on Apr. 2, 2012, which is a continuation of
(Continued)

(51) Int. Cl.
*G02F 1/335*    (2006.01)
*G03H 1/22*    (2006.01)
(Continued)

(52) U.S. Cl.
CPC ........... *G03H 1/2294* (2013.01); *G02F 1/011* (2013.01); *G03H 1/02* (2013.01);
(Continued)

(58) Field of Classification Search
CPC ..................... G02B 6/2726; G03H 2001/0224
See application file for complete search history.

(56) References Cited

U.S. PATENT DOCUMENTS

| | | | | |
|---|---|---|---|---|
| 4,707,698 A | * | 11/1987 | Constant | ................... G01S 7/10 342/179 |
| 5,724,179 A | * | 3/1998 | Hosoi | ..................... G02F 1/125 359/308 |

(Continued)

*Primary Examiner* — Chris Chu
(74) *Attorney, Agent, or Firm* — Norma E. Henderson

(57) ABSTRACT

An anisotropic spatial acousto-optic modulator for a holographic display system includes a substrate, an anisotropic waveguide that guides light into a single polarization, and a transducer that generates surface acoustic waves that propagate linearly with the guided, polarized light, converting at least some of the polarized light into a leaky mode of orthogonally polarized light. The acoustic waves may be encoded with holographic information. The modulator may include coupling devices for coupling light into the waveguide, which may have multiple channels. A holographic video display system includes at least one anisotropic spatial acousto-optic modulator. The pattern of the surface acoustic waves, encoded with holographic information, acts as a diffraction pattern that causes the modulator output to form a wavefront that becomes at least part of a holographic image. The system may have multiple channels in multiple waveguides, wherein each waveguide writes one or more lines of the holographic image.

26 Claims, 13 Drawing Sheets

Related U.S. Application Data application No. 11/837,517, filed on Aug. 11, 2007, now Pat. No. 8,149,265.

(60) Provisional application No. 61/784,887, filed on Mar. 14, 2013.

(51) Int. Cl.
*G02F 1/01* (2006.01)
*G03H 1/02* (2006.01)

(52) U.S. Cl.
CPC ............... *G03H 2001/0224* (2013.01); *G03H 2001/2292* (2013.01); *G03H 2223/17* (2013.01); *G03H 2225/21* (2013.01)

(56) References Cited

U.S. PATENT DOCUMENTS

| | | | | |
|---|---|---|---|---|
| 6,233,372 B1* | 5/2001 | Nakaya | ................ | G02B 6/2726 385/11 |
| 2002/0041721 A1* | 4/2002 | Nakazawa | .............. | G02F 1/116 385/7 |
| 2005/0238277 A1* | 10/2005 | Wang | ................ | A61B 1/00096 385/8 |
| 2008/0138013 A1* | 6/2008 | Parriaux | .............. | G02B 5/1814 385/37 |

* cited by examiner

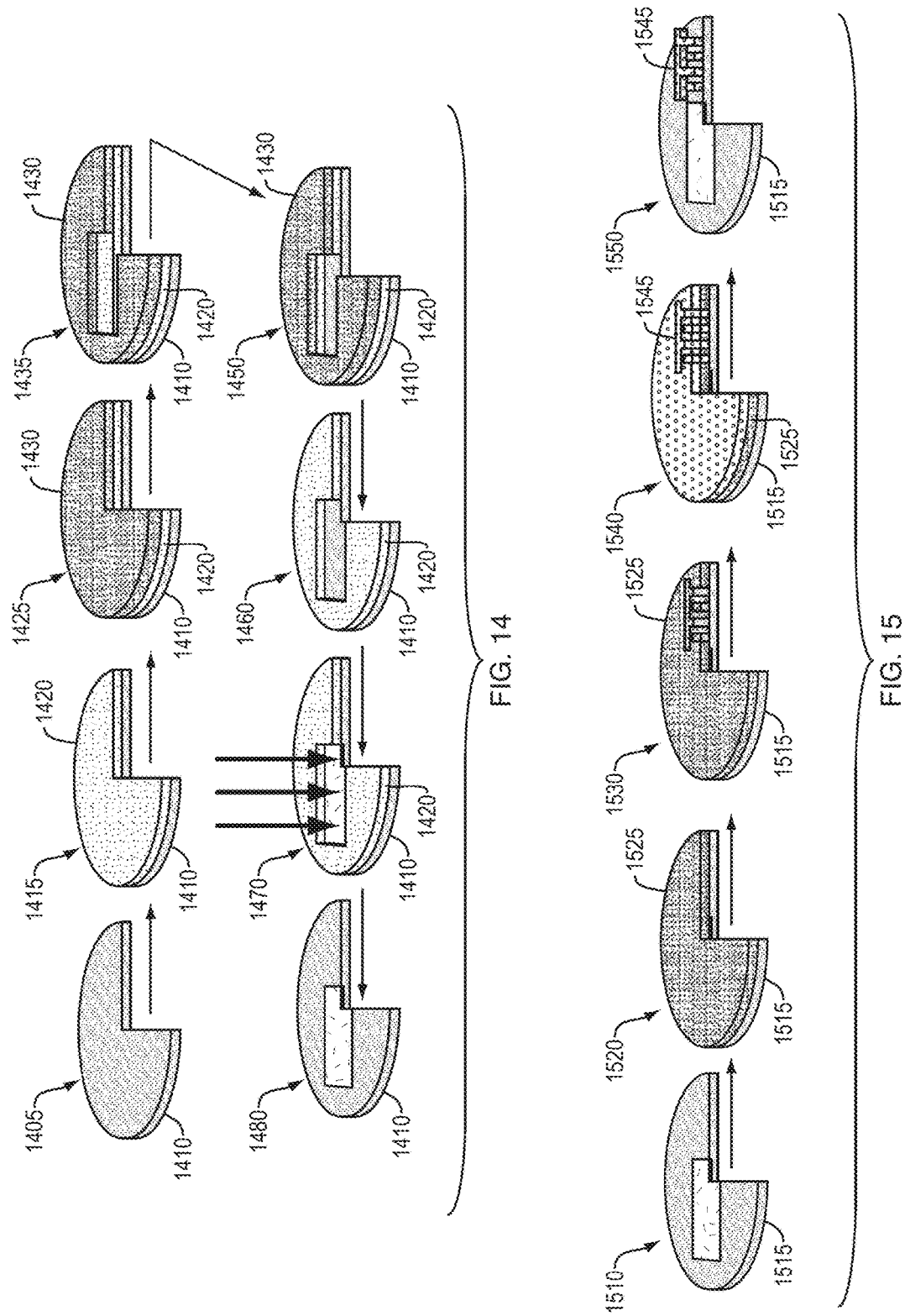

ANISOTROPIC LEAKY-MODE MODULATOR FOR HOLOGRAPHIC VIDEO DISPLAYS

RELATED APPLICATIONS

This application claims the benefit of U.S. Provisional Application Ser. No. 61/784,887, filed Mar. 14, 2013, the entire disclosure of which is herein incorporated by reference.

This application is also a continuation-in-part of co-pending U.S. patent application Ser. No. 13/437,850, filed Apr. 2, 2012, which is a continuation of U.S. patent application Ser. No. 11/837,517, filed Aug. 11, 2007, now U.S. Pat. No. 8,149,265, issued Apr. 3, 2012, the entire disclosures of which are herein incorporated by reference.

FIELD OF THE TECHNOLOGY

The present invention relates to holographic video display devices and, in particular, to modulators for holographic video displays.

BACKGROUND

The limitations and affordances of holographic video displays are chiefly dictated by the spatial light modulators upon which they are built. The temporal bandwidth of the spatial light modulator determines the display size, view angle, and frame rate. The pixel pitch determines the angle of the display or the power of the lenses needed to achieve a wide view angle. The space-bandwidth product, which is related to the numerical aperture of the holographic grating, determines the maximum depth range and number of resolvable views the display will possess. Finally, optical non-idealities of the modulator give rise to noise and artifacts in the display output.

Current state-of-the-art technologies for spatial light modulation (e.g., liquid crystal (LC), micro-electro-mechanical systems (MEMS) [Kreis, T., Aswendt, P., and Hofling, R., "Hologram reconstruction using a digital micromirror device," Optical Engineering, vol. 40, pp. 926-933 (2001); Pearson, E., "MEMS spatial light modulator for holographic displays", S. M. Thesis, Massachusetts Institute of Technology (2001)], and bulk-wave acousto-optic modulators [Hilaire, P., Benton, S., and Lucente, M., "Synthetic aperture holography: a novel approach to three-dimensional displays," Journal of the Optical Society of America A, vol. 9, pp. 1969-1977 (1992)]) have proven challenging to employ in holographic video displays. The currently employed modulators are challenging to use for several reasons: low bandwidth (relative to holograms), high cost, low diffraction angle, poor scalability, quantization error, and the presence of zero and other order noise, unwanted diffractive orders, and zero-order light, as well as spatial or temporal multiplexing of color. These issues must therefore be addressed before using these modulators in a holographic display system.

Much of the cost and complexity of modern holographic displays is due to efforts to compensate for these deficiencies by, e.g., adding eye tracking to deal with low diffraction angle [Haussler, R., Schwerdtner, A., and Leister, N., "Large holographic displays as an alternative to stereoscopic displays," Proceedings of SPIE Stereoscopic Displays and Applications XIX, p. 68030M (2008)], duplicating and phase shifting the optical path to eliminate the zero order [Chen, G.-L., Lin, C.-Y., Kuo, M.-K., and Chang, C.-C., "Numerical suppression of zero-order image in digital holography." Optics Express, vol. 15, pp. 8851-8856 (2007)], or creating large arrays of spatial light modulators to increase the display size [Sato, K., A. Sugita, M. Morimoto, and K. Fujii, "Reconstruction of Color Images at High Quality by a Holographic Display", Proc. SPIE Practical Holography XX, p. 6136 (2006)]. The cost and complexity of holographic video displays can be greatly reduced if a spatial light modulator can be made to have better affordances than the LC and MEMS devices currently employed.

SUMMARY

A spatial light modulator based on anisotropic leaky-mode coupling brings the tools of guided wave optics to bear on the challenges of holographic video and possesses many advantages over current LC and MEMS devices when applied to holographic video display. The device can be fabricated inexpensively and made to support an aggregate temporal bandwidth of more than 50 Gpixels/sec, which represents an order of magnitude increase over the current state-of-the-art. A three-fold increase in angular detection over other modulator technologies is demonstrated, due to the edge-lit nature of the waveguide grating structure and the resulting increase in space-bandwidth product. A modulator according to the invention exploits guided-wave phenomena, most notably anisotropic mode conversion for the elimination of zero-order light and tunable wavelength filtering for the simultaneous and superimposed modulation of color signals.

In one aspect of the invention, an anisotropic spatial acousto-optic modulator for a holographic display system includes a substrate, an anisotropic waveguide residing on the substrate and configured to guide light entering the modulator at the input end into only one polarization, and at least one transducer configured to generate surface acoustic waves that propagate linearly with the guided, polarized light in the anisotropic waveguide, thereby converting at least some of the polarized light into a leaky mode of orthogonal polarized light at the modulator output end. The surface acoustic waves may be encoded with holographic information. In a preferred embodiment, the substrate is lithium niobate, lithium tantalite, or quartz, and the waveguide formed using proton exchange, titanium indiffusion, and/or ion implantation. The modulator may include one or more coupling devices at the input end of the modulator in order to couple light into the anisotropic waveguide. The anisotropic waveguide may have multiple channels. The guided polarized light may be TE polarized light and the leaky polarized light may be leaky TM polarized light, or alternatively the guided polarized light may be TM polarized light and the leaky polarized light may be leaky TE polarized light. The leaky mode may emit a wavefront-modulated fan of light that exits one face of the substrate and forms part of a holographic image.

In another aspect of the invention, a holographic video display system includes at least one anisotropic spatial acousto-optic modulator, and the pattern of the surface acoustic waves is encoded with holographic information and acts as a holographic diffraction pattern that causes the modulator output to scan, focus, or form a wavefront that becomes at least part of a holographic image. The holographic image may be formed by scanning the output of the anisotropic modulator. The modulator waveguide may have multiple channels, and the holographic image may be formed by scanning the output of the multiple-channel modulator waveguide. The system may have multiple channels in multiple waveguides, wherein each waveguide writes one or more lines of the holographic image. The holographic video display system may further include at least one light source adapted to provide one or more wavelengths of light, a signal generator for providing the holographic information used for encoding the surface acoustic waves to the transducer, a scanning subsystem for rendering a holographic image; and an optical path for passing the diffracted light from the acousto-optic modulator to the vertical scanning subsystem.

In a further aspect of the invention, a method for creating holographic images includes the steps of providing one or more wavelengths of light to a holographic video display system, wherein the system includes at least one guided-wave anisotropic leaky-mode spatial acousto-optic modulator; providing holographic information to the anisotropic modulator for use in encoding surface acoustic waves; coupling the light received at the holographic video display system into the anisotropic modulator for diffraction by the surface acoustic waves according to the encoded holographic information; and scanning the diffracted light output by the anisotropic modulator to form the holographic image.

BRIEF DESCRIPTION OF THE DRAWINGS

Other aspects, advantages and novel features of the invention will become more apparent from the following detailed description of the invention when considered in conjunction with the accompanying drawings, wherein:

FIGS. 6 and 7 illustrate waveguide illumination for larger angular diffraction, wherein:

FIG. 6 is a graph of diffraction output angle vs. input illumination angle for a 10 μm period grating illuminated with 633 nm light; and FIG. 7 depicts the differential effect of output angle with incident angle;

FIGS. 8 and 9 illustrate wavelength division multiplexing for color displays, wherein:

FIG. 8 is a graph of frequency response of the anisotropic mode coupling device for red, green, and blue light; and FIG. 9 depicts frequency multiplexing of red, green, and blue light;

FIGS. 10A-B are holographic stereograms made with a prototype single channel anisotropic waveguide modulator displayed at 35 mm by 20 mm, wherein:

FIG. 10A is a monochrome holographic stereogram; and

FIG. 10B is a color holographic stereogram using simultaneous and superimposed modulation of red, green, and blue light;

FIGS. 11-13 depict aspects of an exemplary PC-driven holographic video monitor, wherein:

FIG. 11 depicts the exemplary holographic video monitor optical path;

FIG. 12 depicts the exemplary internal path folding of the holographic video monitor; and FIG. 13 depicts the assembled exemplary holographic video monitor;

FIG. 14 depicts exemplary steps for forming a proton-exchanged waveguide according to one aspect of the invention;

FIG. 15 depicts exemplary steps for lift-off fabrication of transducers according to one aspect of the invention;

DETAILED DESCRIPTION

Figure 2:
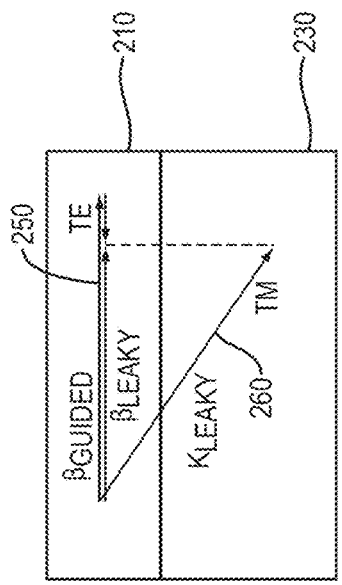
FIG. 2 depicts the phase matching condition for anisotropic guided-to-leaky mode coupling.

Anisotropic leaky mode-couplers are employed as novel modulators for holographic video displays in order to address the problems with prior art modulators. These modulators can be fabricated simply, monolithically, and at low cost. Additionally, these modulators are capable of entirely new functionalities, such as, but not limited to, wavelength division multiplexing for color display. Three affordances of particular interest have been demonstrated: polarization rotation, enlarged angular diffraction, and frequency domain color filtering. The present invention is presented as a platform for low cost, high performance holographic video displays.

In one aspect, the present invention is a spatial light modulator based on anisotropic leaky-mode coupling, which brings the tools of guided wave optics to bear on the challenges of holographic video and possesses many advantages over LC and MEMS devices when applied to holographic video displays. The device can be fabricated inexpensively and made to support an aggregate temporal bandwidth of more than 50 Gpixels/sec, which is an order of magnitude increase over the current state-of-the-art. A three-fold increase in angular deflection over other modulator technologies has been demonstrated, due to the edge-lit nature of the waveguide grating structure and the resulting increase in space-bandwidth product. The modulator exploits guided-wave phenomena, most notably anisotropic mode conversion for the elimination of zero-order light and tunable wavelength filtering for the simultaneous and superimposed modulation of color signals.

Structurally, a preferred embodiment of an anisotropic leaky-mode coupler according to the invention is a proton-exchanged [Jackel, J., Rice, C., and Veselka, J., "Proton exchange for high-index waveguides in LiNbO3," Applied Physics Letters, vol. 41, pp. 607-608 (1982)] channel waveguide on a lithium niobate substrate with a transducer at one end [Matteo, A., Tsai, C., and Do, N., "Collinear guided wave to leaky wave acoustooptic interactions in proton-exchanged LiNbO3 waveguides", IEEE Transactions on Ultrasonics, Ferroelectrics and Frequency Control, vol. 47, pp. 16-28 (2000); Rust, U., and Strake, E., "Acoustooptical coupling of guided to substrate modes in planar proton-exchanged LiNbO3-waveguides," Proceedings of Integrated Photonics Research, pp. 94-95 (1992)]. The waveguide is anisotropic and only guides light in one polarization. When excited by an RF signal, the transducer generates surface acoustic waves [Onural, L., Bozdagi, G., and Atalar, A., "A new holographic 3-dimensional television display," Proceedings of the 1991 IEEE Ultrasonics Symposium, pp. 543-546 (1991)] that propagate collinearly with the light trapped in the anisotropic waveguide.

While a preferred embodiment employs a proton-exchanged lithium niobate substrate, the substrate could be any anisotropic, piezoelectric substrate which supports waveguides and surface acoustic wave propagation. Suitable substrates include, but are not limited to, lithium niobate, lithium tantalite, and quartz. The waveguide may be formed using proton exchange, titanium indiffusion, ion implantation, any combination of these techniques, or by other suitable methodologies known in the art.

Figure 1:
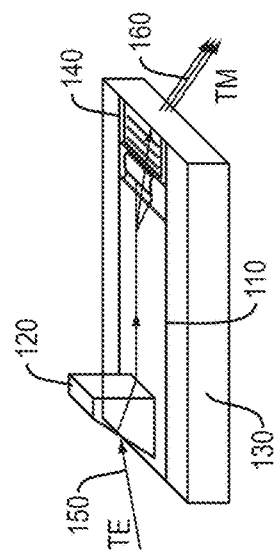
FIG. 1 depicts an exemplary embodiment of a single channel anisotropic mode-coupling modulator according to the invention.

FIG. 1 depicts an exemplary embodiment of a single channel anisotropic mode-coupling modulator according to the invention. Shown in FIG. 1 are anisotropic waveguide 110, coupling prism 120, lithium niobate substrate 130, and SAW transducer 140. Guided, TE polarized light 150 interacts with surface acoustic waves (SAW) which convert it into leaky TM polarized light 160. TM to TE coupling is also possible in Z-cut lithium niobate. The acoustic pattern acts as the holographic diffraction pattern and can cause the output to scan, focus, or form a wavefront that will become part of a holographic image.

While the exemplary embodiment of FIG. 1 employs a coupling prism, it will be clear to one of skill in the art that input coupling could also be accomplished using a coupling grating, fiber coupling, such as a slab-coupled fiber or fibers, free-space coupling, or other suitable means known in the art. For prism coupling, a prism of higher index than that of the waveguide material is placed above the waveguide. A small air gap exists between the prism and the waveguide. Light inside the prism which bounces off of the bottom face creates an evanescent field that penetrates into the waveguide and light then couples via this evanescent field into to the waveguide when the wavenumber inside the prism corresponds to the wavenumber of a propagating mode in the waveguide. For grating coupling, a grating exists in or above the waveguide which adds momentum to the wavenumber of the incident light. When the resulting light matches the wavenumber of a propagating mode inside the waveguide, light is coupled into the waveguide. For fiber coupling, a fiber is cut, polished and placed either at the end of the waveguide (butt coupled) or above the waveguide (evanescent coupling). The light in the fiber travels into the waveguide. The resulting reflection and loss is a function of the mismatch between the waveguide mode shape and the fiber mode shape.

While the exemplary embodiment of FIG. 1 employs a SAW transducer, it will be clear to one of skill in the art that there may be more than one transducer per channel and that the invention will work with either travelling or standing waves. Travelling or standing surface acoustic waves can be encoded with holographic information. Traveling waves are created by one or more transducers launching surface acoustic waves in the same direction. Standing waves are created by one (in a very special case) or more transducers launching waves in opposite directions. When these contra-linear waves meet they form a standing wave pattern. Unlike traveling waves, standing waves appear stationary. These waves can be more easily made to have high spatial frequency and high modulation. They also do not technically require descanning, since they are already stationary. They may be scanned, or multiplexed, however, in order to achieve large images.

When the phase-matching condition is met, $$\beta_{guided} - K_{grating} = \beta_{leaky}$$

where $\beta_{guided}$ is the wavevector of the guided TE mode, $K_{grating}$ is the grating vector corresponding to the acoustic pattern encoded with holographic information, and $\beta_{leaky}$ is the component of the wavevector of the leaky TM mode along the direction of the grating vector and the guided mode.

FIG. 2 depicts the phase matching condition for anisotropic guided-to-leaky mode coupling. Shown in FIG. 2 are waveguide 210, substrate 230, TE polarized light 250 and leaky TM polarized light 260.

The acoustic pattern, encoded with holographic information, couples the guided light into a leaky mode of orthogonal polarization which exits the waveguide-substrate interface. The index contrast of the waveguide-air interface is much higher than that of the waveguide-substrate interface; this asymmetry of boundary conditions means that there is no conjugate image. This leaky mode emits a wavefront-modulated fan of light that exits one face of the wafer and forms part of a holographic output image. Each channel waveguide writes one or more lines of the output and several channels can be fabricated next to each other to create large aggregate bandwidths suitable for large display size and resolution. It should be noted that guided-to-leaky mode interaction assumes guided-freespace modes as a special case.

Figure 3:
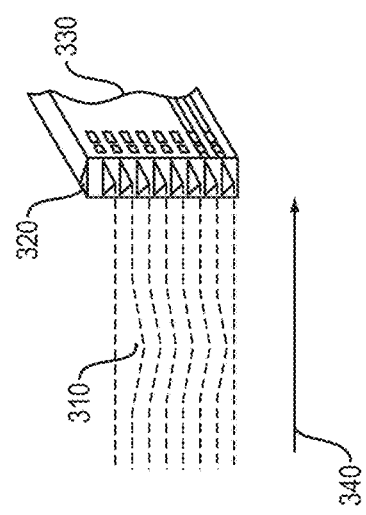
FIG. 3 depicts scanned-aperture holographic image formation.

FIG. 3 depicts scanned-aperture holographic image formation. Shown in FIG. 3 are holographic image wavefront 310 from the scanned aperture, prism 320, array of light modulating channels 330, and the direction of scan 340. The holographic image is formed by scanning the aperture of an anisotropic waveguide device having one or more channels.

Figure 4:
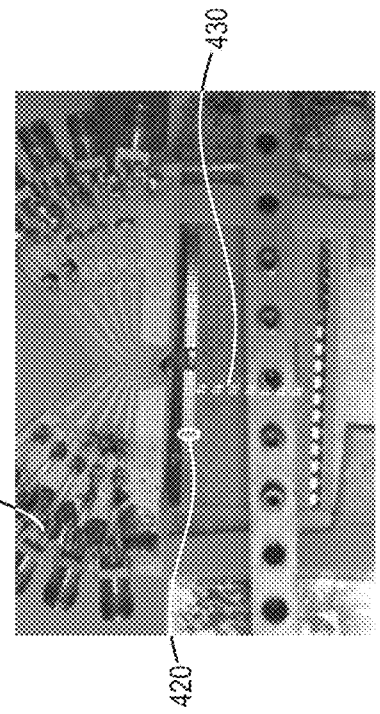
FIG. 4 is a photograph of a prototype embodiment of a multichannel anisotropic waveguide modulator according to the invention.

A prototype embodiment of a multichannel anisotropic waveguide modulator is shown in FIG. 4. Visible in FIG. 4 are RF input 410, transducer 420, and waveguide channel 430. The modulator pictured has more than 40 channels. Prototype devices with as many as 1250 channels have been fabricated.

Anisotropic leaky-mode couplers possess several advantages over other spatial light modulators used for holographic video. In addition to being simple to fabricate and drive, they are capable of high deflection for a given pixel pitch and can leverage tools from guided-wave optics to address noise and color multiplexing. Table presents some of the advantages of anisotropic waveguide modulators over pixelated modulators (MEMS and Liquid Crystal devices).

TABLE 1

| Affordance | Pixelated Modulators | Anisotropic Waveguide Modulator |
| --- | --- | --- |
| Temporal Bandwidth | 5 Gpixel/sec (8 Mpixels) | 50 Gpixels/sec (500 channels) |
| Output Angle ($\lambda$ = 532 nm, $\Lambda$ = 12 μm) | 2.54 deg. | 24.7 deg. |

TABLE 1-continued

| Affordance | Pixelated Modulators | Anisotropic Waveguide Modulator |
|---|---|---|
| Output Polarization Orthogonal to Zero order | no | yes |
| Fabrication Complexity | 20 masks | 2 masks |
| Superfluous Conjugate Mode | yes | no |
| Hologram Approximation Basis | quantized pixels | sinusoidal waves |
| Color Multiplexing | space/time | space/time/frequency |

All values in Table 1 are approximate. It should be noted that the angle of the output light in an anisotropic modulator is a function of waveguide parameters, such as the orientation of the substrate material (X-cut, Y-propagating in this case) and the wavenumber of the guided mode.

Modulators with defined pixel structure and a backplane (e.g., LC and MEMS devices) become more complex as pixels are added, which constrains scalability. Bulk-wave acousto-optic modulators can produce the acoustic equivalent of 100 million pixels per second per acoustic channel; however, channels cannot be placed too closely together because of the resulting crosstalk. Anisotropic leaky mode couplers enjoy lateral guidance of the acoustic wave, which makes it possible for adjacent channels to be placed tens of microns apart and for hundreds of channels to be placed side-by-side on a single substrate, thereby providing aggregate bandwidths in excess of 50 billion pixels/sec. This bandwidth is nearly an order of magnitude greater than the temporal bandwidth of current pixelated modulators. A device with 500 channels can provide enough bandwidth to drive a horizontal-parallax only (HPO) holographic display one meter in width. Devices with as many as 1250 channels have been fabricated.

Fabrication of active LC and MEMS devices requires 20 or more mask steps to define both the pixels and the associated backplane. Only two masks are required to fabricate guided-wave modulators: one to define the waveguide structure and one to pattern the transducers. The resulting fabrication and cost are similar to that of common SAW filters which sell for a dollar or less. A device capable of producing standard resolution HPO holographic video images would be in the low tens of dollars to fabricate as a conservative estimate.

Guided wave modulators are analog devices and can be driven by up-converted, standard analog video signals, generated by, e.g., standard graphics cards commonly employed in high-end graphics work. Since the modulators are analog and have no pre-defined pixel microstructure, there is no intrinsic quantization of the signal. The device transducers can be used as filters to band-limit quantization noise that might be present in the video signal. As with pixelated modulators, light may diffract from harmonics of the acoustic signal, giving rise to higher-order diffracted signals; however, in anisotropic mode couplers, typically only one order is present at the output of the device. This is because conjugate modes are prohibited by waveguide asymmetry and higher-order modes are suppressed at the output by high angular separation of orders and total internal reflection.

In addition to the points maden above, three other advantages of particular interest are made possible by the waveguide nature of the device—hologram polarization rotation, increased angular deflection, and simultaneous and superimposed RGB modulation.

Figure 5A:
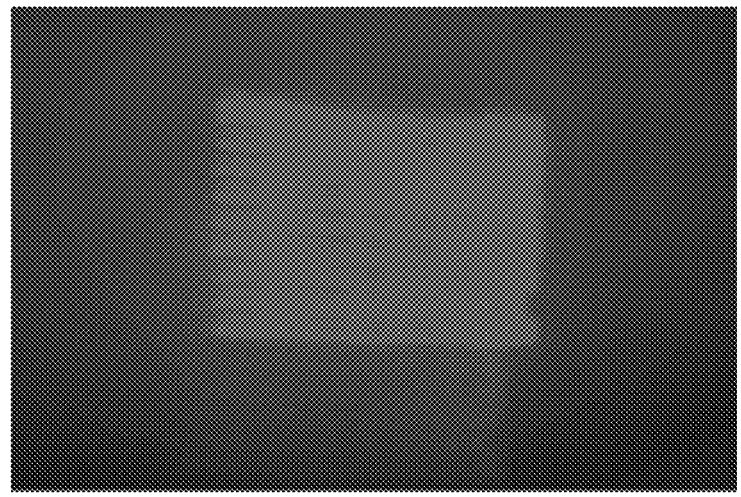
FIGS. 5A-B depict the scanned output of a prototype embodiment of the modulator without a polarizer (FIG. 5A) and with a polarizer to exclude noise (FIG. 5B)
Figure 5B:
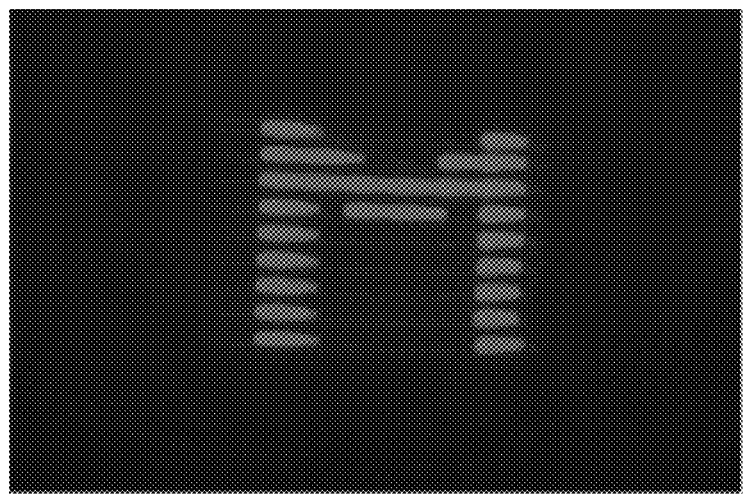

Polarization Rotation. The waveguide in the guided-wave acousto-optic modulator is anisotropic, so that it supports guided modes of only one polarization. Modes of the orthogonal polarization are leaky. The acoustic signal couples light from the fundamental extraordinary guided mode to the first order leaky mode, rotating its polarization along the way [Proklov, V., and Korablev, E., "Multichannel waveguide devices using collinear acoustooptic interaction," Proceedings of the 1992 IEEE Ultrasonics Symposium, pp. 173-178 (1992); Ito, K., and Kawamoto, K., "An optical deflector using collinear acoustooptic coupling fabricated on proton-exchanged LiNbO3," Japanese Journal of Applied Physics, vol. 37, pp. 4858-4865 (1998)]. As a result, the holographic image produced by the anisotropic waveguide modulator has a polarization that is orthogonal to all of the other light in the system. This allows noise, including zero-order light, to be excluded from the output with a polarizer. The scanned output of the modulator is shown in FIGS. 5A-B without a polarizer (FIG. 5A) and with a polarizer to exclude noise (FIG. 5B).

Wider Angular Deflection. Since the acoustic wave is being effectively illuminated by light at a glancing angle rather than at normal incidence, the resulting diffracted angle can be more than three times higher than it would be at normal incidence on another modulator of the same pixel pitch. This is shown in FIG. 6, which was generated from the grating equation, $$\sin\theta_{out} - \sin\theta_{in} = \frac{m\lambda}{\Lambda}$$

where $\theta_{in}$ is the angle of the illumination light, $\theta_{out}$ is the angle of the output light, $\Lambda$ is the grating period, $\lambda$ is the wavelength of light used, and m is the diffracted order. Standard modulators are illuminated near the grating normal but waveguided light interacts with the acoustic grating nearly collinearly.

Figure 6:
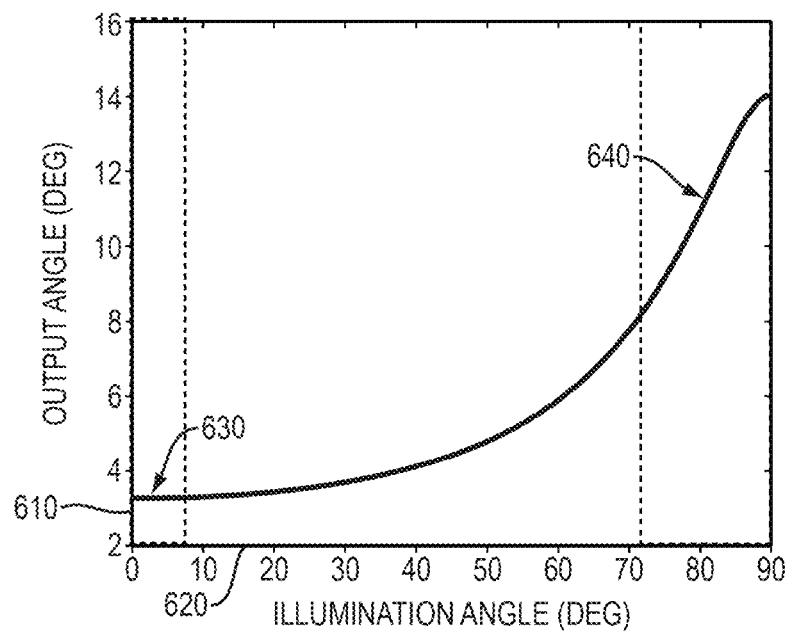
Figure 7:
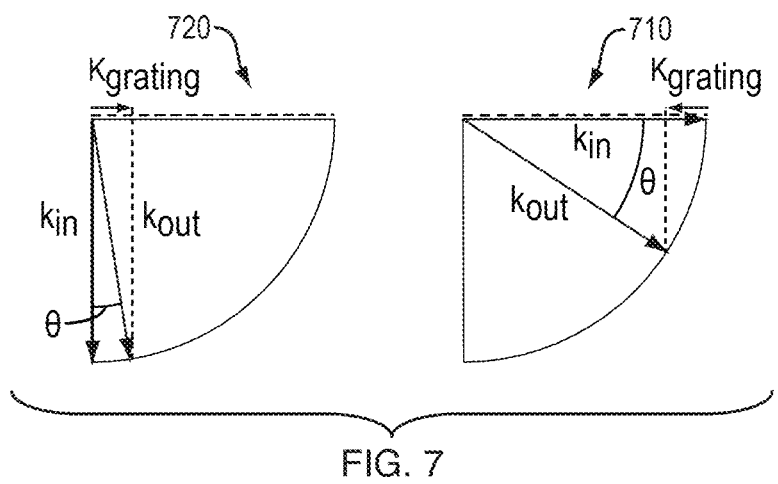

FIGS. 6 and 7 illustrate waveguide illumination for larger angular diffraction. FIG. 6 is a graph of diffraction output angle 610 vs. input illumination angle 620 for a 10 μm period grating illuminated with 633 nm light, in particular showing normal illumination 630 and near-collinear waveguide illumination 640. Pixelated modulators and bulk-wave acousto-optic modulators are typically illuminated at angles normal or nearly normal to the face of the device, which affords a smaller range of diffracted output angles than is possible for a device illuminated at nearly collinear angles (such as is the case in the anisotropic waveguide modulator).

The differential effect of output angle with incident angle is shown in FIG. 7. Seen in FIG. 7 is angular output magnification for near-collinear waveguide illumination 710 relative to illumination at normal incidence 720. Note that θ is much larger for collinear illumination, even though $K_{grating}$ is the same in both cases.

This effect is further magnified when the grating is inside a high index material, as is the case in waveguide modulators. This is because the signal light is further deflected by refraction at the output face of the substrate. For the prototype anisotropic modulator, the output angle for 532 nm light was measured to be 24.7 degrees for a 12 μm period acoustic grating generated on the device by a 326 MHz RF signal. Since the anisotropic interaction limits the usable bandwidth of the modulator to approximately 50 MHz per color [Matteo, A., Tsai, C., and Do, N., "Collinear guided wave to leaky wave acoustooptic interactions in proton-exchanged LiNbO3 waveguides", IEEE Transactions on Ultrasonics, Ferroelectrics and Frequency Control, vol. 47, pp. 16-28 (2000)], and because demagnification is used in the supporting optics to choose the final display view angle, only a fraction (2.6 degrees for 532 nm light) of this angular extent is used. The modulator presents an output that, when scanned, looks like a 1 meter image with a 2.6 degree viewzone. This image will be demagnified for a final display output with approximately 10 centimeters of extent and a 26 degree viewzone. Having a small input angle and large demagnification ratio is intentional in the display, as it reduces the requirements placed on the scanning optics and keeps the display compact. In the display geometry, the chief advantage of this angular expansion in anisotropic devices is that it gives approximately a five-fold increase in the rate of angular deflection (degrees of deflection per MHz of signal bandwidth) than is typically available to lithium niobate acousto-optic deflectors, bringing the angular rate of deflection of the anisotropic modulator almost to parity with slow shear mode tellurium dioxide Bragg Cells, but at a fraction of the cost and with the added advantages of lower acoustic attenuation and dramatically higher channel capacity.

Simultaneous, superimposed RGB modulation. Anisotropic waveguide devices are capable of multiplexing color in frequency rather than in time or space. In LC, MEMS, and Bulk AO modulators, it is necessary either to dedicate pixels to one color or to sequentially illuminate the SLM, thereby reducing the resolution or the maximum refresh rate. However, waveguide devices can employ wavelength division multiplexing (WDM), which allows for simultaneous and superimposed modulation of red, green, and blue light so that no color filter wheel or separation of red, green, and blue channels is necessary. This effect arises because the phase matching condition is wavelength dependent. Red light mode converts at a lower frequency than green light, which in turn couples at a lower frequency than blue, allowing one to choose which color to modulate by 'coloring' the frequency spectrum of the electrical signal sent to the modulator's transducers.

Figure 8:
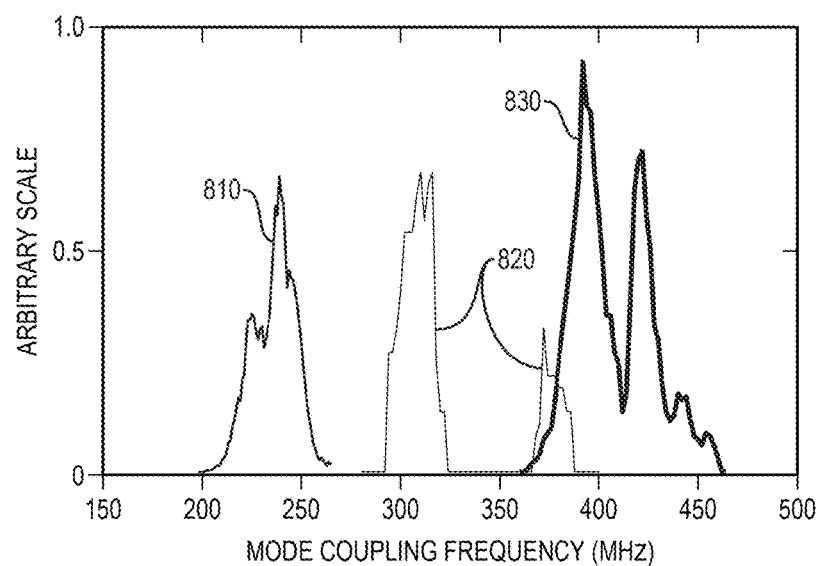
Figure 9:
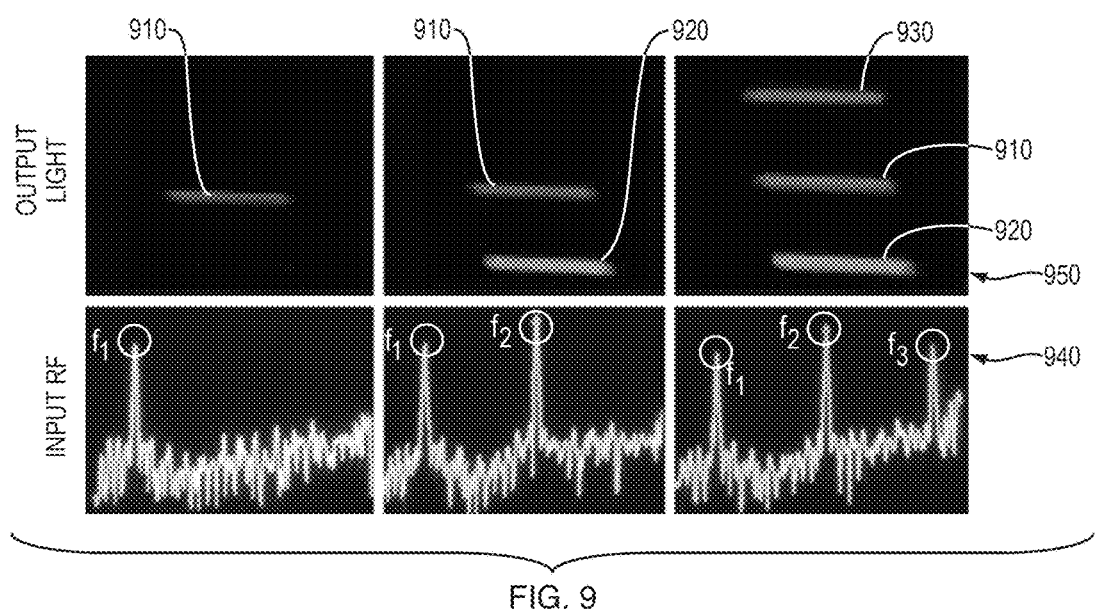

FIGS. 8 and 9 illustrate wavelength division multiplexing for color displays. FIG. 8 is a graph of frequency response of the anisotropic mode coupling device for red 810, green 820, and blue 830 light. FIG. 9 depicts frequency multiplexing of red 910, green 920, and blue 930 light, showing the input RF 940 and output light 950.

Because each channel is essentially a white-light emitter, the illumination of the device becomes trivial. Each channel or group of channels can be flood illuminated by continuous red, green, and blue light sources. This interaction is particularly well suited for color holographic displays, because the phenomenon of leaky mode coupling allows enough bandwidth for each color to scan out a useful fan of angles, but at the same time each passband is sufficiently separated to allow for independent operation. Furthermore, it is also very convenient that all three color bands fit approximately within the 200 MHz available from analog video outputs of standard graphics processors.

To demonstrate simultaneous, superimposed RGB modulation, one channel of an anisotropic waveguide array was illuminated with continuous red, green, and blue light ($\lambda$=633 nm, $\lambda$=532 nm, and $\lambda$=445 nm). A single, wideband transducer was simulated with an RF signal containing color information that was separated in frequency with red information centered at 213 MHz, green at 333 MHz, and blue at 387 MHz. The diffracted output of the modulator was scanned with X-Y galvanometric mirrors to generate the test pattern in FIG. 9. Then the output of the modulator was descanned with a rotating polygon and multiplexed vertically with a galvanometer to generate the holographic stereogram images shown in FIGS. 10A-B using a modified Scophony architecture (FIGS. 11-13) [Hilaire, P., Benton, S., and Lucente, M., "Synthetic aperture holography: a novel approach to three-dimensional displays," Journal of the Optical Society of America A, vol. 9, pp. 1969-1977 (1992); Lee, H. "The scophony television receiver," Nature, vol. 142, pp. 59-62 (1938)].

Figure 10A:
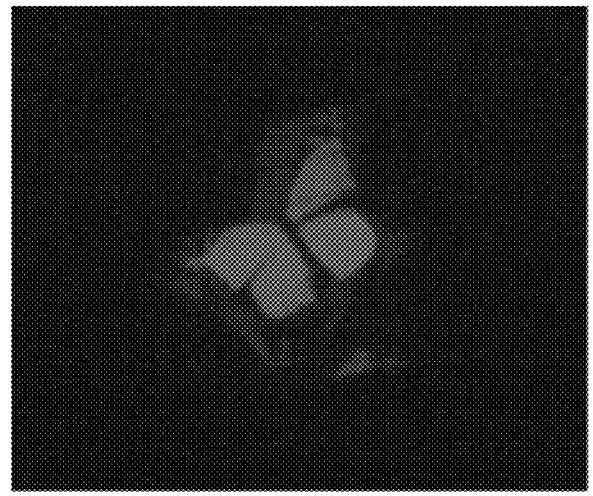
Figure 10B:
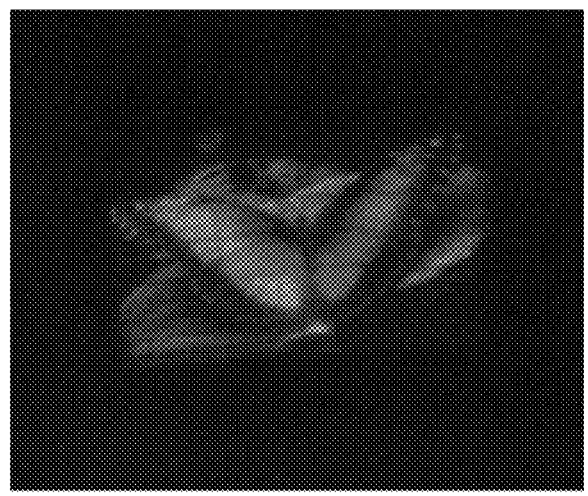

FIGS. 10A-B are holographic stereograms made with a single channel anisotropic waveguide modulator displayed at 35 mm by 20 mm. FIG. 10A is a monochrome holographic stereogram. FIG. 10B is a color holographic stereogram using simultaneous and superimposed modulation of red, green, and blue light. The holographic stereograms were displayed at a resolution of 156×177600 and at a refresh rate of 5 frames/sec (here frame rate was traded for vertical resolution, so an image could be made from a single channel device).

Figure 11:
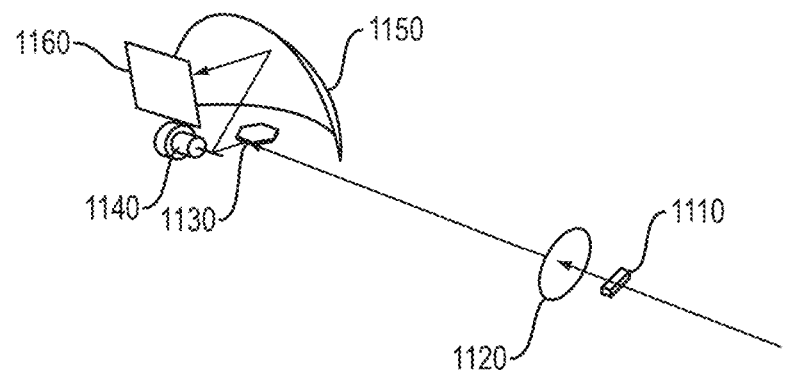
Figure 12:
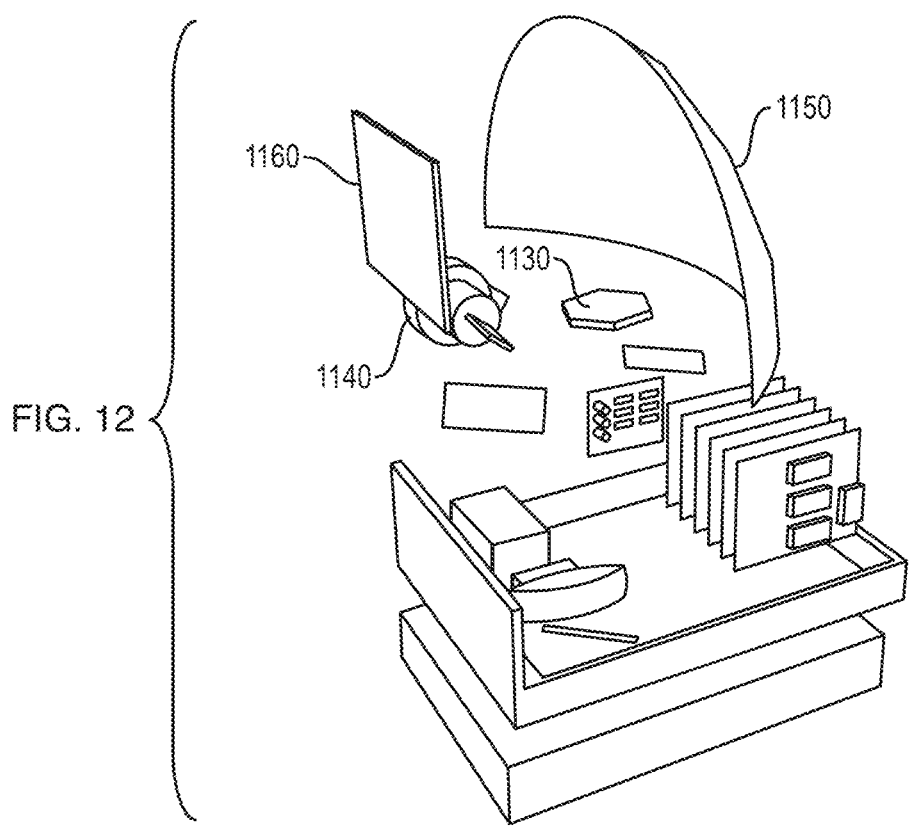
Figure 13:
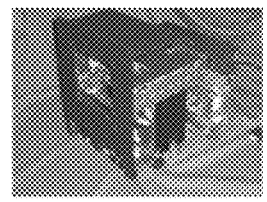

FIGS. 11-13 depict aspects of an exemplary PC-driven holographic video monitor. FIG. 11 depicts the exemplary holographic video monitor optical path. Shown in FIG. 11 are modulator 1110, transform lens 1120, horizontal scanner 1130, vertical scanner 1140, parabolic reflector 1150, and diffuser 1160. FIG. 12 depicts the exemplary internal path folding of the holographic video monitor of FIG. 11. FIG. 13 depicts the assembled exemplary holographic video monitor.

Given the advantages of the anisotropic leaky-mode spatial light modulator of the invention, a new family of flexible holographic video displays is now possible. In holographic video displays using anisotropic mode couplers, the output of the device is scanned to create large outputs by persistence of vision. Since the modulator is an analog device, display parameters such as frame rate, view angle, image extent and vertical resolution can be interchanged fluidly as long as the bandwidth budget is satisfied. If more space-bandwidth product (which is related to the concept of numerical aperture and to the total number of scannable points in diffractive systems) is needed, the length of the channels can be extended to provide longer interaction lengths in accordance with the expression $$N = \frac{L\Delta f}{v}$$

where N is the space-bandwidth product (or number of scannable points), L is the channel length, v is the velocity of the acoustic wave, and $\Delta f$ is the bandwidth of the anisotropic mode coupling interaction. If more temporal bandwidth is needed, more channels can be added to the modulator. When there are enough channels in an array to write all the necessary output lines simultaneously, there is no longer a need for vertical scanning and the problem of holographic video display becomes reduced to a single axis scan. With all lines written at once, the scanning optics are only required to make a full sweep once every 1/30 or 1/60 of a second, greatly expanding the size and type of scanning elements that may be used, which means that large displays can be more physically parsimonious than small ones.

Having demonstrated the advantages of anisotropic mode couplers, displays based on arrays of these devices have been developed, such as a small, PC driven, holographic video monitor and large-scale displays exceeding half a meter in width driven by dedicated hardware. Given the recent progress made in using GPUs for hologram fringe computation [Bove, V., Plesniak, W., Quentmeyer, T., and Barabas, J., "Real-time holographic video images with commodity PC hardware," Proceedings of SPIE Stereoscopic Displays and Applications, pp. 255-262 (2005); Barabas, J., Smithwick, Q., Smalley, D., and Bove, V. M., "Real-time shader rendering of holographic stereograms," Proceedings of SPIE Practical Holography XXIII: Materials and Applications, pp. 723-303 (2009); Smithwick, Q., Barabas, J., Smalley, D., and Bove, V. M., "Interactive Holographic Stereograms with Accommodation Cues," Proceedings of SPIE Practical Holography XXIV: Materials and Applications, pp. 761-903 (2010)], it is now possible, using anisotropic mode coupling arrays driven by a commodity PC with a bank of high-end graphics cards, to make holographic video monitors with full-color, standard video resolution and a 30 Hz refresh rate. Research shows such a monitor might be constructed for less than $500 (not including light sources).

Experimental methods. To demonstrate polarization rotation, light from a diode laser at $\lambda=633$ nm was evanescently coupled into an anisotropic leaky mode device using a rutile prism. The output of the device was scanned with a XY scanner onto a CCD imager. A polarizer was placed at the output of device.

The mode coupling frequency response for red, green, and blue light was measured by coupling laser light into the $TE_1$ guided mode of the device and then exciting an acoustic wave with an RF signal that swept from 150-500 MHz. The light that was coupled into the leaky mode was measured with a light meter. This process was repeated for each of red, green, and blue. Note that the shape of the device's frequency response shown in FIG. 8 represents not only the frequency response of the anisotropic interaction alone, but also the response of the SAW transducer and the impedance matching network that was designed to give the best match at frequencies responsible for blue mode coupling. The power of the input light was 10 mW for red and 100 mW for green and blue.

The holographic stereogram images were created by taking one stereogram view at a resolution of 296×156, stretching its resolution to 29600×156, and finally stitching 12 of these images together for a composite resolution of 355200×156. The alpha values of each of the red, green, and blue channels of this image were multiplied by a different sinusoidal pattern in an OpenGL shader. All three color signals were summed and divided by three, and sent out one of the video card outputs (e.g., the nominal 'red' channel). This signal was then up-converted and amplified before entering a single transducer of the modulator array.

For holographic stereogram images, light from three lasers (at $\lambda=445$ nm, $\lambda=532$ nm, and $\lambda=633$ nm) was combined in an X cube and focused with an achromatic lens into one channel of an anisotropic leaky mode coupling array. The output of the device was spatially filtered and focused on to the face of a spinning polygon (to optically descan the holographic fringe pattern so that it would appear stationary), vertically scanned onto a parabolic mirror (using the geometry shown in FIG. 11), and finally imaged by a camera. For simplicity, only the view entering the camera was computed and displayed. The vertical diffuser 1160 shown in FIG. 11, which extends the vertical viewzone of horizontal parallax only (HPO) holograms, was not used.

Fabrication of a Proton-Exchange Waveguide According to the Invention.

An exemplary embodiment of the proton exchange process for fabrication of a proton-exchange waveguide according to the invention is illustrated in FIG. 14. Start 1405 with x-cut lithium niobate wafer 1410 1 mm thick. Clean wafer 1410 using a standard cleaning process (3:1:1 ammonium hydroxide, hydrogen peroxide and water heated to 80° C.). Rinse wafer 1410 in deionized water and with a solvent, such as isopropanol, to prevent residue formation during drying. Use Physically Enhanced Chemical Vapor Deposition (PECVD) to deposit 1415 200 nm silicon dioxide (SiOx) 1420 on wafer 1410. Spin 1425 on NR8-1000 (negative resist) 1430 at 3 krpm and pre-bake in an oven at 100° C. for 7 minutes. Pattern and develop 1435 resist 1430 by exposing the pattern with a light-field mask to define waveguides 1440 and then developing resist 1430 in 2% Tetramethylammonium hydroxide (TMAH) solution. Etch 1450 the underlying exposed silicon dioxide 1420 in a buffered oxide etch for 30 seconds. Remove 1460 resist 1430 with acetone. Heat benzoic acid (diluted with 1% lithium benzoate by weight) to 220° C. Carefully immerse 1470 the wafer in the melt for 30 minutes. The wafer must be warmed gradually before entering the melt or it may break; consider lowering the wafer to just above the melt surface to allow it to warm to the melt temperature before submerging. Remove wafer after 30 minutes, slowly so that the wafer does not crack. Let cool and clean with acetone and isopropyl alcohol (IPA). Remove 1480 the silicon dioxide 1420 by submerging in buffered oxide etch for 30 seconds. Place wafer in a covered quartz dish and then bake for 45 minutes in an oven preheated to a temperature of 375° C.

Lift-Off Fabrication of Aluminum Transducers According to the Invention.

An exemplary embodiment of the proton exchange process for fabrication of aluminum transducers according to the invention is illustrated in FIG. 15. Begin 1510 with clean proton exchanged substrate 1515, such as a proton-exchanged lithium niobate wafer created using the process of FIG. 14. Spin 1520 photo photoresist 1525 by spinning 600 nm of polymethyl methacrylate (PMMA) and baking at 150.0 for 15 minutes. Spin on a layer of E-spacer or Aquasave to prevent charging while direct writing with an electron beam. This could alternatively be accomplished with a think evaporated layer of chrome, which would have to be stripped before development. Pattern and develop 1530 resist 1525 by direct write of the transducer pattern with an electron beam at a dose of approximately 200 $\mu C/cm^2$. For the prototype, the transducer was composed of three regions, with uniform periods corresponding to 270 MHz, 310 MHz, and 380 MHz, respectively. The features of these transducers are large enough to be patterned by photolithography if desired, but direct write allows for a high degree of customization and is convenient for small samples. Remove the Aquasave or E-spacer from the exposed sample with deionized water and develop the PMMA in a 1:1 mixture of IPA:Methyl isobutyl ketone (MIBK) for approximately 30 seconds. Deposit 1540 a 200 nm film of aluminum 1545 by e-beam evaporation. Place the sample in N-Methylpyrrolidone (NMP) heated to 50° C. Wait for aluminum to lift off 1550. If necessary sonicate on low power for 5 seconds. Polish the exit face of the sample down to a 0.3 μm grit. Clean with acetone, methanol, and isopropyl alcohol. Wire bond the transducers, using 2 mil aluminum wire, to a copper PCB board with 50 ohm RF connector. Impedance match with lumped element L network (typically the samples would require a 100 nH series inductor followed by a 9 pF shunt capacitor) match for the highest resonance (this is to make up for the fact that the blue interaction is the least efficient).

Experiments. Polarization rotation. To demonstrate polarization rotation, light from a diode laser at λ=633 nm was evanescently coupled into an anisotropic leaky mode device using a rutile prism. The output of the device was scanned with an XY scanner onto a camera sensor (the camera lens was removed to allow for lower ISO images and less camera noise). A polarizer was placed at the output of device.

Frequency Multiplexing of Color. The mode coupling frequency response for red, green, and blue light was measured by coupling laser light into the $TE_1$ guided mode of the device and then exciting an acoustic wave with an RF signal that swept from 150-500 MHz. The light that was coupled into the leaky mode was measured with a light meter. This process was repeated for red, green, and blue. Note that the shape of the device's frequency response represents not only the frequency response of the anisotropic interaction alone, but also the response of the SAW transducer and the impedance matching network that was designed to give the best match at frequencies responsible for blue mode coupling. The power of the input light was 10 mW for red and 100 mW for green and blue.

Holographic Stereograms. The holographic stereogram images were created by taking one stereogram view at a resolution of 296×156, stretching its resolution to 29600×156, and finally stitching 12 of these images together for a composite resolution of 355200×156. The alpha values of each of the red, green, and blue channels of this image were multiplied by a different sinusoidal pattern in an OpenGL shader. All three color signals were summed and divided by three, and sent out one of the video card outputs (e.g., the nominal 'red' channel). This signal was then up-converted and amplified before entering a single transducer of the modulator array.

For holographic stereogram images, light from three lasers (at λ=445 nm, λ=532 nm, and λ=633 nm) was combined in an X cube and focused with an achromatic lens into one channel of an anisotropic leaky mode coupling array. The output of the device was spatially filtered and focused onto the face of a spinning polygon (to optically descan the holographic fringe pattern so that it would appear stationary), vertically scanned onto a parabolic mirror, and finally imaged by a camera. For simplicity, only the view entering the camera was computed and displayed. The vertical diffuser 1160 of FIG. 11, which extends the vertical viewzone of horizontal parallax only (HPO) holograms, was not used.

Waveguide-Based Platform and Tools for Diffractive Projection, Printing, and Display. A new platform for hologram display and projection (2D and 3D) was devised, as well as a number of related novel techniques for solving challenges related to diffractive displays using this platform.

Multichannel Waveguide Platform. Holographic displays, and diffractive displays in general, require pixel resolutions many times those of standard 2D displays. Furthermore, these pixel requirements scale with display size. These requirements have limited the size of video-rate electroholographic displays (absent viewer tracking). One important purpose of the multichannel modulator platform is to provide enough image pixels for displays of relatively large size (as much as 1 meter wide or wider) by writing each holographic line in parallel. One way to understand the function of the modulator in a holographic system is to think of it as part of Persistence of Vision (POV).

Figure 16A:
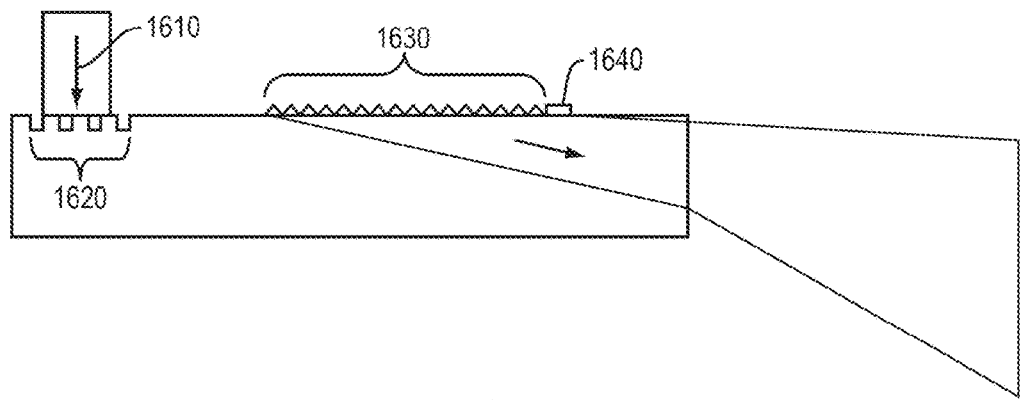
FIGS. 16A-B are side and top views of an exemplary mulitchannel modulator according to the invention.
Figure 16B:
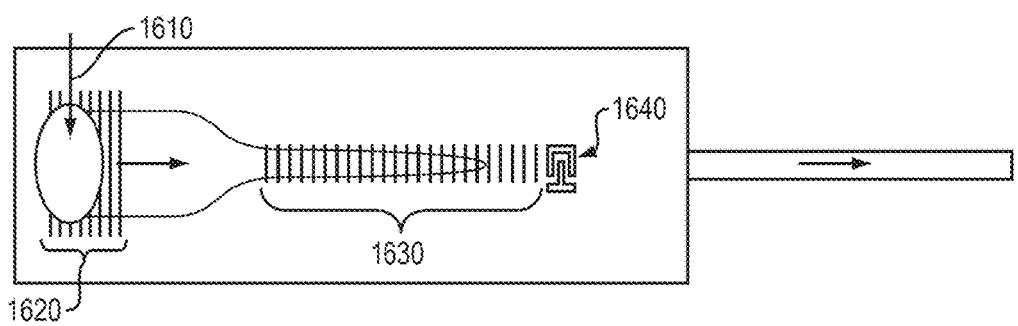
Figure 17:
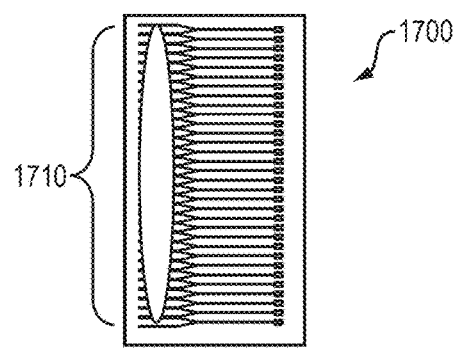
FIG. 17 is a view of the VGA array of the multichannel modulator of FIGS. 16A-B.

FIGS. 16A-B are side and top views of an exemplary mulitchannel modulator. Shown in FIGS. 16A-B are input light 1610 fixed input grating 1620, variable acoustic output grating 1630, and acoustic transducer 1640. FIG. 17 is a view of the VGA array 1700 of the multichannel modulator of FIGS. 16A-B. As shown in FIG. 17, 480 channels 1710 provide 48 Gpixels/sec.

Figure 18A:
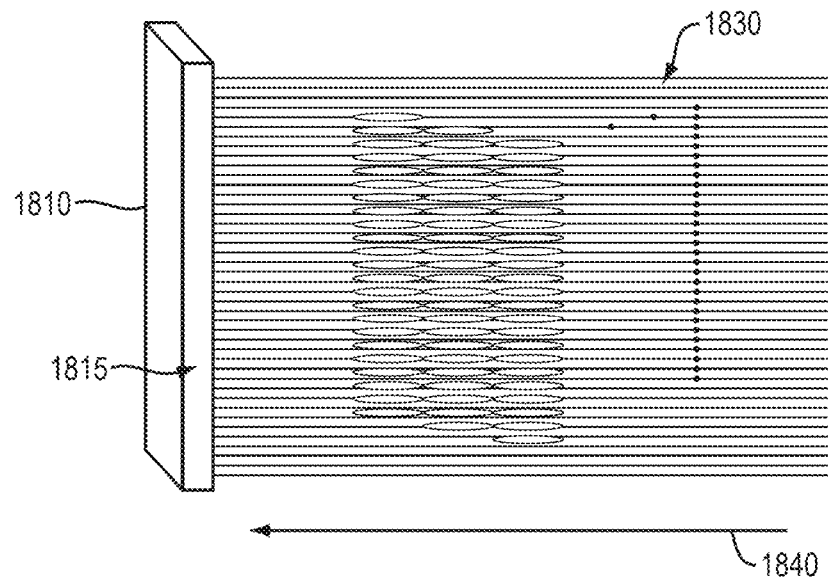
FIGS. 18A-B illustrate the persistence of vision displays for a 2D scanned display (FIG. 18A) and a 3D scanned display (FIG. 18B)
Figure 18B:
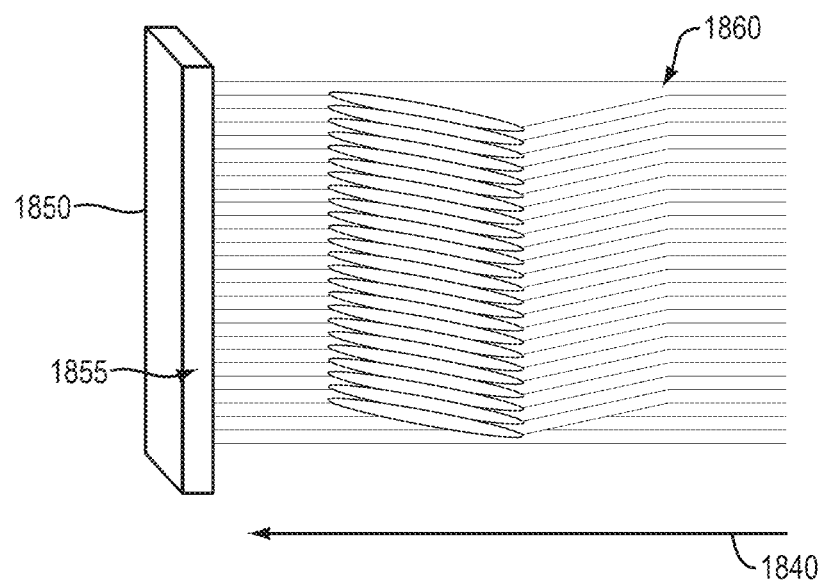

A 2D POV display may be made by horizontally scanning a vertical strip of LEDs, which modulate the amplitude of light in time as the strip is scanned. When the multichannel modulator is scanned, it also creates a wide display output. However, in addition to modulating light amplitude, the modulator can also control angle and phase as well as provide a curved wavefront corresponding to points in 3D space. FIGS. 18A-B illustrate the persistence of vision displays for a 2D scanned display (FIG. 18A) and a 3D scanned display (FIG. 18B). Shown in FIG. 18A are intensity modulator 1810 with channels 1815, 2D scanned display 1820, and direction of scan 1840. Shown in FIG. 18B are intensity, angle, and phase modulator 1850 with channels 1855, 3D scanned display 1860, and direction of scan 1840.

The waveguide platform allows many tools and techniques from integrated optics and surface acoustic wave devices to be brought to bear on the challenges of holographic projection and display. Waveguide techniques used include mode coupling, electro-optic effect, multiphoton interaction, quasi-phase matching, surface acoustic wave filtering and wavelength division multiplexing (WDM).

Wavelength division multiplexing for RGB display (WDM-RGB) makes it possible to achieve the simultaneous and independent out-coupling of light, which is superimposed in a waveguide for more elegant and efficient operation. A carefully designed waveguide out-coupling system can possess the wavelength selectivity required for simultaneous, independent modulation of multiple color signals. With such a system, one can achieve independent color modulation within a single shared channel rather than multiple dedicated channels. This technique obviates the need for space and time color multiplexing schemes such as color filters or color wheels, and is novel to displays in general, not just to diffractive displays.

Figure 19A:
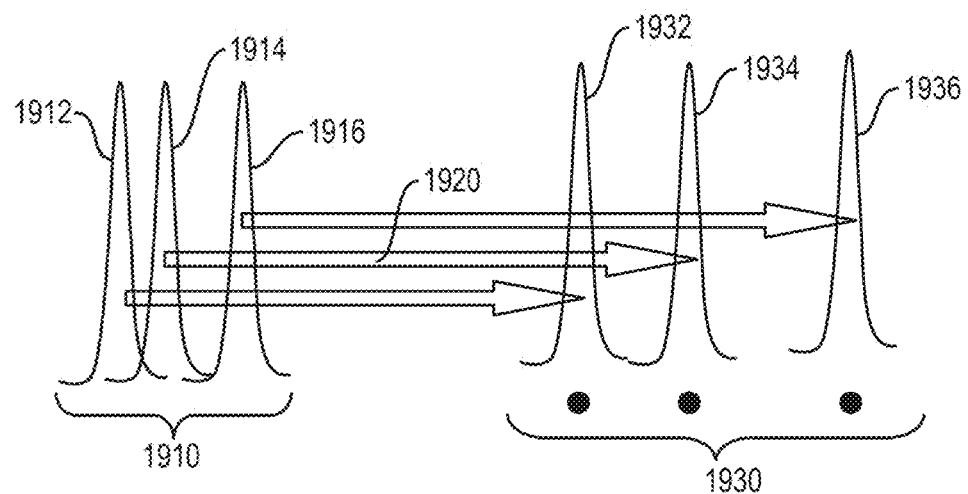
FIGS. 19A-C illustrate mode coupling for Wavelength Division Multiplexing, depicting guided modes (FIG. 19A), freespace modes (FIG. 19B), and leaky modes (FIG. 19C), respectively.
Figure 19B:
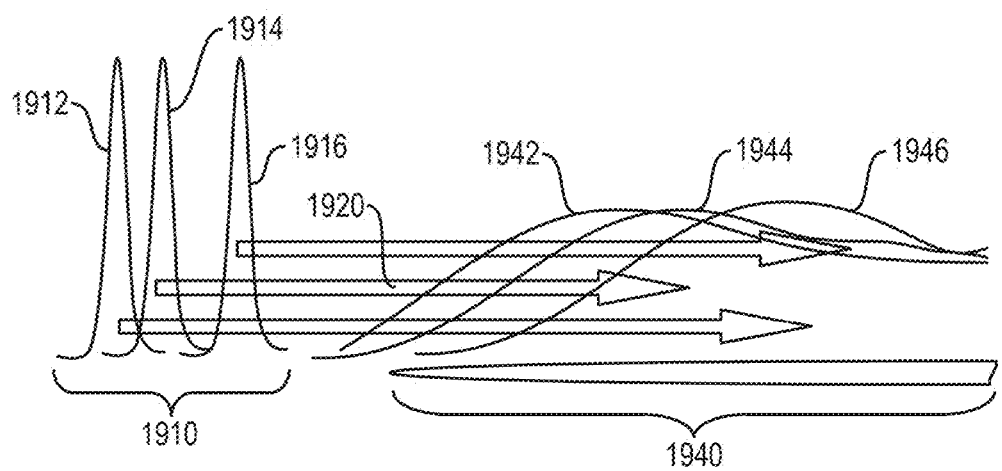
Figure 19C:
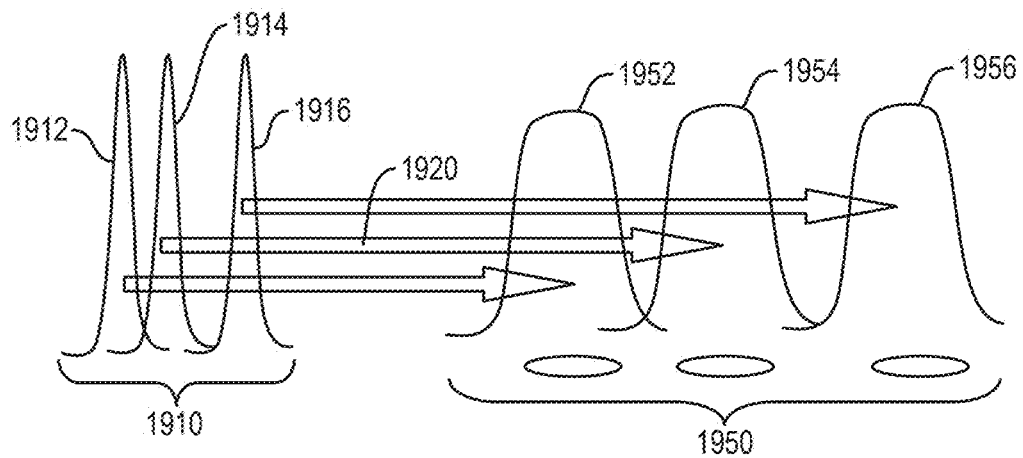

FIGS. 19A-C illustrate mode coupling for wavelength division multiplexing, depicting guided modes (FIG. 19A), freespace modes (FIG. 19B), and leaky modes (FIG. 19C), respectively. Shown in FIGS. 19A-C are input guided modes 1910 for red 1912, green 1914, and blue 1916 light, grating momentum 1920, output guided modes 1930 for red 1932, green 1934, and blue 1936 light, freespace modes 1940 for red 1942, green 1944, and blue 1946 light, and leaky modes 1950 for red 1952, green 1954, and blue 1956 light.

Figure 20A:
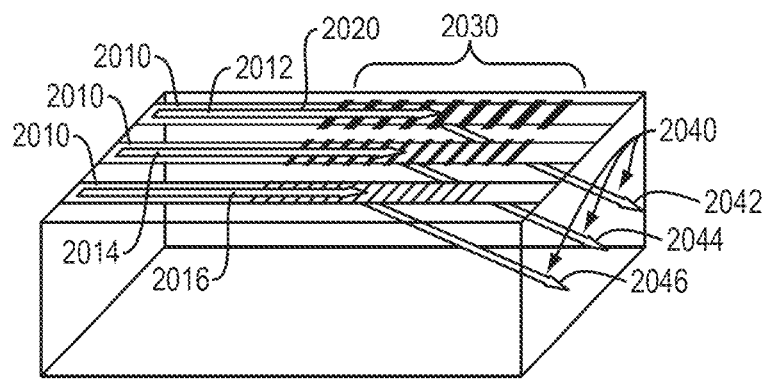
FIGS. 20A-C illustrate exemplary embodiments of Wavelength Division Multiplexing for simple display devices.
Figure 20B:
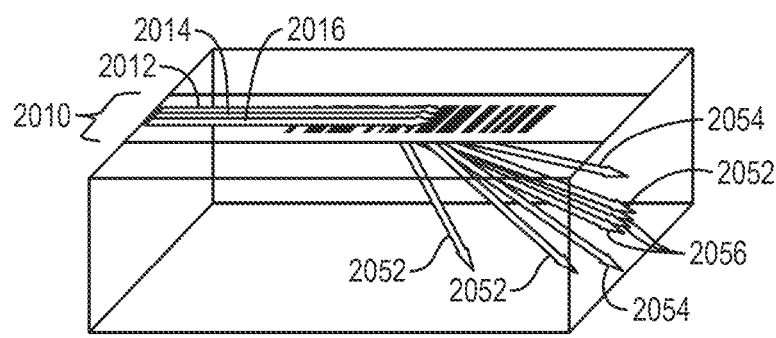
Figure 20C:
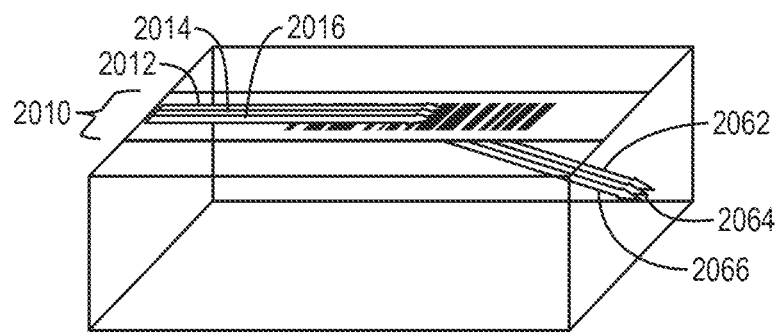

FIGS. 20A-C illustrate exemplary embodiments of wavelength division multiplexing for simpler display devices. FIG. 20A depicts light modulation in multiple channels. Shown in FIG. 20A are input guided light 2010 in red 2012, green 2014, and blue 2016, waveguide 2020, grating 2030, and out-coupled light 2040 in red 2042, green 2044, and blue 2046. FIG. 20B depicts light modulation of multiple wavelengths in a single channel without wavelength selectivity, with output light in red 2052, green 2054, and blue 2056. FIG. 20C depicts light modulation of multiple wavelengths in a single channel with wavelength selectivity, with output light in red 2062, green 2064, and blue 2066.

Anisotropic Mode-Coupling (AMC) for noise reduction in diffractive displays refers to the ability of mode-coupled light (guided to guided mode or guided to leaky mode) to be polarization rotated. This effect can be used to separate the signal light in a diffractive display from the noise, as well as from the zero order or undiffracted light. This effect can be used to increase the quality, safety, and simplicity of the diffractive display.

Quantization Filtering (QF) in SAW Structures for diffractive display. The filtering nature of Surface Acoustic Wave Transducers can be used to filter the video signal, which may have unwanted elements, such as quantization noise or carrier frequency interference.

Edge-Lit Grating Illumination (ELGI) for increased diffracted output angle. Light interacting with a grating collinearly, rather than perpendicularly, can be scanned over larger angles. This effect can be used to achieve relatively high angles of diffracted output and reduce the requirements of high resolution placed on the spatial light modulator. This effect provides a special advantage to waveguide modulators, which operate in this edge-lit regime, over other spatial light modulators.

Electro-Optic Speckle Reduction (EOSR), Electro-Optic Phase Procession (EOPP), and Phased-Array Steering (PAS). Electro-optic phase variation of adjacent channels in a multichannel modulator may be used to eliminate or average out the self-interference that gives rise to undesirable speckle in the output of laser-illuminated displays. This effect may be reversed if interference is desired, in which case the phase of certain channels may be locked to each other. In fact, one or more channels in this interfering group may be advanced in phase to account for the scanning of the modulator aperture to create diffractive patterns that are coherent in space over large distances. This is helpful for writing photosensitive materials often used as the front-end of a diffractive display. Groups of channels may also act as phased-array emitters and use varying values of phase retardation to steer the modulator output. This could be used, for example, to provide vertical parallax in a 3D diffractive display.

Electro-Optic Amplitude Modulation/Shuttering in diffractive displays (EOAM). In-line Mach-Zender interferometer systems in multichannel modulators may be used to shutter, strobe, or amplitude modulate output light. One usage scenario for this system is strobing an acoustic pattern to make it appear stationary. It may also be combined with phase modulation to enable the creation of diffractive output patterns that are fully complex (phase and amplitude modulated) for better display quality.

Multi-Photon Interaction and quasi-phase matching for illumination/noise reduction in diffractive displays (MPI). Integrating periodically-poled regions in multichannel modulators enables multiphoton interactions like sum or difference frequency generation (e.g. Second Harmonic Generation). One result of these multiphoton interactions is that the input light is of a different wavelength than the output light, which means that a waveguide modulator could be illuminated with invisible infrared light that would not add to the noise of the system, and output visible signal light. Such an arrangement will also loosen the requirements on a grating input coupler, which can be made with a coarser pitch.

WDM-RGB. A waveguide system was created in which center spatial frequency for the out-coupling of one color of guided light would be sufficiently far from the center spatial frequency for out-coupling of another color of guided light, in order to allow for the simultaneous, independent out-coupling of both wavelengths of guided light, even when both colors of light and their respective out-coupling gratings are all superimposed (FIGS. 19A-C). The efficiency for the out-coupling of first color by the second grating can be minimized, and vice-versa for independent simultaneous out-coupling of both colors. This multiplexing can be extended to several colors, both visible and invisible.

An exemplary implementation is a waveguide with a tunable acoustic grating can couple light from one guided mode to another or from guided modes to leaky modes and freespace modes. There is only a small discrete set of frequencies that will couple light from one guided mode to another (FIG. 19A). A single grating frequency will typically only couple to a single guided mode. This means the light can be angularly modulated (via mode coupling) from one mode without disturbing the other modes. However, the range of angular modulation is very small. There is a continuous spectrum of frequencies that will mode-convert guided modes to free-space modes so the range of modulation is very large. However, one grating frequency will couple light from several guided modes to several free-space modes, and one cannot select a particular mode independently from the rest. Guided to leaky mode coupling can be made to have a modest amount of angular modulation, while still maintaining the independent coupling of one mode to another (FIG. 19C). A display based on angularly modulated leaky mode devices can therefore process red, green, and blue light in the same waveguide simultaneously.

Multichannel Waveguide Platform. A guided wave modulator may be composed of one or more waveguides fabricated on Lithium Niobate (X, Y or Z cut) (though it is possible to use Lithium Tantalate, quartz, or glass with a piezo material such as Zinc Oxide or Lithium Niobate) by using proton exchange or another waveguide technique (metal indiffusion, doping, deposition of another material of differing index) to create channel waveguides on the surface of the substrate. Each channel waveguide corresponds to one or more horizontal lines in the final display. Standard photolithographic techniques are used to pattern aluminum transducers for each channel. These transducers create surface acoustic waves that are also guided by the proton exchanged channel regions and interact with the guided light to affect guided to leaky mode coupling. The surface acoustic wave pattern is effectively a holographic fringe pattern and encodes wavefront information on the leaky mode light. This output light exits the substrate from the polished edge of the wafer. Alternatively, it could be made to exit through the bottom or top face. This would result in a monolithic display that would be direct-viewable and not require scanning.

The output is then demagnified, descanned horizontally, and magnified vertically to meet the output requirements of the overall display. The descan can be accomplished by galvonometric scanners, spinning polygon mirrors, arrays of resonant mirrors, or with angle-scanning MEMs devices or some combination of a scanner and one or more holographic optical elements or reflective optics. The demagnification can be accomplished with lenses or curved mirrors in a telescope configuration. For some cuts and orientations, this mode coupling interaction results in the polarization rotation of the output light, allowing the elimination of zero order and quantization noise by the use of polarizers (AMC). The mode coupling interaction condition is sufficiently different for red, green, and blue wavelengths to allow wavelength division multiplexing, such that red, green, and blue light (or some other combination of spectrally separated colors) can be modulated at the same time in the same channel by acoustic waves which are separated in frequency (WDM-RGB). Narrow channel widths of 100 um or smaller allow for the fabrication of 500 or more channels, side-by-side, on a single substrate without any need for 'fan-out' of electrode connections. Higher channel densities are also possible.

Light can enter the waveguide by prism coupling, a coupling grating, or coupling from a fiber through butt-coupling or evanescent coupling techniques. The linear electro-optic effect may be used in each channel to phase retard or advance the light, creating a vertical phase grating which could be used to provide vertical parallax or other phase effects (EOPP, PAS, EOSR). The linear electro-optic effect could also be used to amplitude modulate the light (splitting the entrance of each channel into a Mach Zender interfereometer), which could be used to strobe the holographic pattern and reduce the requirement for fast descan optics on the output or to increase the gray-scale bit depth of the output image (EOAM). Input coupling noise can be eliminated by input coupling infrared light, and then frequency doubling that light once it is trapped in the waveguide (using a periodically-poled substrate) before it interacts with the acoustic waves, or may enable energetic light of one frequency to be decomposed into one or more visible frequencies for illuminating the modulator based on periodic phase matching structures on the modulator (e.g. periodic poling) (MPI).

AMC. Light trapped in an anisotropic waveguide that has off-diagonal tensor elements which break continuous translational symmetry may be converted from one polarization to another if the phase matching condition is met (even if only approximately). In the preferred embodiment of the multichannel modulator, symmetry is broken by off-diagonal elements in the tensor and by the anisotropic nature of the proton-exchanged waveguide in Lithium Niobate. Polarization rotation can be accomplished for guided-to-guided modes and for guided-to-leaky modes, where leaky modes occur in waveguides that have positive or negative index contrast (that is, the waveguide index may be higher than the substrate, as is typical, or lower, in which case modes are Fresnel-reflecting 'gap guided' modes).

QF. When interdigital electrodes are used to excite acoustic waves on multichannel waveguide modulators, the design will determine the spatial frequencies contained in the acoustic signal. The finger number, the presence and rate of change of the finger location (chirping), the apodization, the number of fingers in a period, and the slant of the fingers can be used to shape this frequency response. For example, by carefully chirping the separation of the fingers, a flat pass-band and sharp cutoff can be achieved, allowing only the video signal to pass eliminating out of band quantization noise. Such filtering can help to compensate for variations in the material response, for example, by equalizing the diffraction efficiency across the red, green, and blue frequency bands used in WDM-RGB.

Figure 21A:
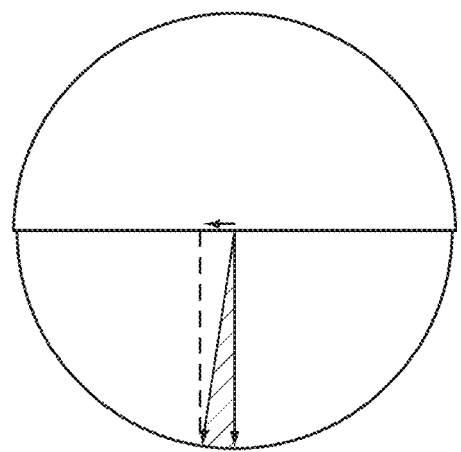
FIGS. 21A-B illustrate normal (FIG. 21A) vs. edge-lit (FIG. 21B) grating illumination.
Figure 21B:
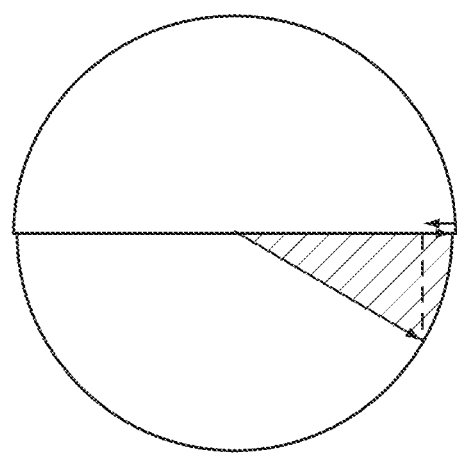

ELGI. Light approaching a grating from a glancing, near-collinear angle effectively 'sees' a grating of high spatial frequency. This is a consequence of the vectorial nature of conservation of momentum. Collinear vectors, when added, result in larger sum vectors than do orthogonal vectors. The resulting sweep of angles is higher for a variable grating that is illuminated from a glancing, or 'Edge-Lit' angle. FIGS. 21A-B illustrate normal (FIG. 21A) vs. edge-lit (FIG. 21B) grating illumination.

EOSR, EOPP, EOAM, and PAS. Many of the materials listed for use as substrates for multichannel modulators possess indices of refraction that can be modified by an electric field. As such, an electrode placed above a waveguide or straddling a waveguide may change its index of refraction when an electric field is applied. The resulting waveguide is optically longer and light traveling through this waveguide will be phase-retarded at the output. A waveguide may be split and each leg of the resulting Mach-Zender structure modulated independently so that the light will interfere with itself at the output (either in the waveguide or in freespace). The amplitude of the output light will be greater or smaller, depending on whether the interference was constructive or destructive. Amplitude modulation can be accomplished in this way. Furthermore, the far field pattern created can be changed by controlling the phase retardation. The pattern of light generated by far field interference of the channels may be shifted by retarding one or more legs of the interference group of channels. This can be used to average out speckle or to lock a far field pattern to a scanning output. Also, by cascading the phase retarder and amplitude modulator described above, fully complex (phase and amplitude modulated) signals can be created. Finally, groups of channels or even independently phase modulated subdivisions of channels may serve as a phased array of emitters. Their mutual interference creates a far field gain pattern that may be steered.

MPI. Nonlinear materials like Lithium Niobate provide the opportunity for coupling from one frequency of light to another. This is facilitated in Lithium Niobate by quasi-phase matching using periodic poling of the ferroelectric domains. In some multiphoton interactions like Optical Parametric Generation, the resulting optical frequencies can be chosen by modifying the spatial frequency of the periodically poled domains.

The invention provides a number of advancements and improvements over existing methods and devices. Among other advantages, it provides a multichannel waveguide platform. The 480 channel version of the device is capable of writing more pixels per second (>48 Gpixels/sec) than any existing acousto-optic modulator, MEMs device, or LCD, making large-sized, video-rate electroholographic displays possible without viewer tracking. It has the highest temporal bandwidth of any spatial light modulator, appropriate for diffractive display, known to the inventors. Writing all horizontal lines of the display simultaneously reduces the requirements placed on the descan optics, as they only need to scan at the frame rate, rather than the line rate or some multiple of the frame rate, as has previously been the case.

The waveguide nature of the modulator also allows the use of waveguide optical techniques, such as waveguide lenses, electro-optic amplitude and phase modulation, frequency doubling and other multi-photon interactions, wavelength division multiplexing, light and acoustic wave confinement, and mode coupling, as above. The high channel density and narrow channel width of this modulator leads to a good overlap between acoustic waves and light waves and improves the resulting mode coupling efficiency.

The device is analog and has no inherent quantization error, unlike digital devices such as MEMs, LCD, and LCOS modulators. The analog nature of the device also makes it possible to drive the channels directly from an upconverted VGA video signal. This device couples light into a single output signal mode and does not create multiple extraneous orders as is the case with MEMs, LCD, LCOS, and other thin-grating devices.

Pixelated spatial light modulators have fixed space bandwidth products. However, a waveguide modulator can increase its space bandwidth product simply by allowing the acoustic wave pattern to propagate a longer distance. This allows multichannel modulators to easily achieve higher space bandwidth products with only trivial modifications to the fabrication of the device. Furthermore, the strong guidance of the acoustic and optical waves and the relatively low acoustic and optical attenuation in these systems means that interaction regions can be made much longer than is possible in bulk wave acousto-optic modulators.

WDM-RGB according to the present invention obviates the need for time or space multiplexing in RGB displays. Different colors must either take turns in today's displays, or separate pixels, or even entire modulators must be dedicated to the modulation of each color. This is no longer necessary, as the WDM technique allows red, green, and blue, (or any other set of sufficiently separated spectral colors, visible or not), when superimposed in the same waveguide, to be modulated simultaneously and independently, reducing the cost and complexity of color displays.

WDM-RGB can be controlled with standard video inputs. It is especially convenient that the band of operation for all three colors, red, green, and blue, can be made to lie approximately within 200 Mhz, which is the current standard bandwidth for a signal generated by a graphics card. This means that a 'white channel' (red, green, and blue) can be controlled entirely by one output signal from a graphics card (whereas such a signal in current displays would only control one color). This means that a display based on a multichannel modulator may be made to work just like a standard video monitor, controlled with standard analog video inputs. This technique can reduce the number of channels needed for a waveguide display, scanner, or projector by N, where N is the number of output wavelengths for lower fabrication real estate compared to commercial light modulators. This technique allows several lower bandwidth out-coupling gratings to be replaced by a single wide band out-coupling grating. This technique also makes it possible for two or more wavelength multiplexed functions to be performed at the same time in the same space, such as, for example, a terminal that both emits visible light for display and invisible structured light for 3D capture.

AMC. State of the art technologies will either duplicate the entire display and then combine the outputs with some phase retardation to eliminate the zero order, or require that the eye act as a spatial filter for the zero order. Alternatively, a display might attempt to spatially filter parts of the zero order that fall outside the active band of the modulator. None of these methods is likely to be as effective, simple, and inexpensive as using AMC to separate signal from zero order light. A similar argument may be made for other types of noise in the environment.

QF. Spatial light modulators with pixels will have quantization noise due to the edges of the pixel boundaries as well as quantization of the signal sent to the pixels, especially in the case of binary signals. Even bulk-wave acousto-optic modulators will have some noise from the quantization of the analog signal used to drive the modulator, though some of the high frequency noise will be attenuated by the material properties of the crystal. Waveguide modulators with QF have band limited sinusoids with no quantization noise due to pixelization and can be made to have no out-of-band quantization noise from the drive signal because of the filtering of the transducers. The result is elimination of the characteristic haze that often attends diffractive images.

ELGI. Current modulators use light at normal or near normal illumination. A waveguide modulator using Edge-Lit regime illumination can achieve more than three times the diffraction angle for a certain range of pixel pitches, allowing systems to get much better viewing angles with the same or even lower resolutions. This improves display performance and relaxes the pressure on photo lithography enabling lower cost fabrication.

EOSR, EOPP, EOAM, and PAS. EOSR uses an elegant, low-cost, solid-state method of reducing speckle, unlike moving/spinning phase plate, which is a popular current method. EOPP makes it possible to use a waveguide modulator that may have a modest space bandwidth product to write a light sensitive material, such as an OASLM or photorefractive polymer, with a pattern that has an arbitrarily high space bandwidth product for displays with extremely high numerical aperture and depth. This can easily be accomplished with waveguide modulators that can scan continuously over the surface. A pixelated modulator, on the other hand, would require a carefully orchestrated step, register, and flash procedure, or a large multilens image multiplication system. EOAM, along with phase modulation, allows the parsimonious fabrication of modulators with fully complex outputs that can be added to a standard waveguide modulator with vanishingly small cost and effort. In contrast, current methods require the careful alignment of phase retardation layers to a pixelated modulator, which adds cost, complexity and reduces light throughput. PAS is a solid state method of adding vertical parallax. Current methods of this include dense holographic patterns that require a 1000× increase in bandwidth or backlight steering, which adds cost and complexity.

MPI. Current modulators are have the same input and output light frequency. Stray light from the source can cause noise in current systems. Furthermore, modulators are not perfectly efficient and so some source light becomes noise. Input coupling to a waveguide can often be very lossy, with a large fraction of the input light not entering the waveguide or with some of the light entering an unwanted mode. A modulator with MPI may have a different output wavelength than input wavelength. If the input wavelength is invisible, then there will be no noise from the source to degrade the output image and only the light that makes it into the correct mode will be converted to visible light and used for display. The phase matching condition can be varied so that a single source of input light may be converted in 3 or more frequencies of visible light on-chip, possibly reducing the cost and complexity of the modulator. In the case of infrared illumination and Second Harmonic Generation, the grating pitch required for input is larger and easier to create with photolithographic processes.

Commercial applications of the multichannel waveguide platform and waveguide techniques. The ultra-high bandwidth modulators and associated tools made possible by this platform have many applications. Such a modulator may be used as, for example (but not limited to), the primary component of a large (>1 meter) holographic video display in both straight-screen and curved (alcove) formats. Six of these modulators would be sufficient to create a circular, room-sized display for immersive electro-holographic simulation. More modulators would allow for floor and ceiling imagery, for increased resolution, vertical parallax, and for increased viewing zone as desired.

The modulator may also be used as the light modulator for any high bandwidth display, 2D display, multi-beam display, multi-view display, or volume-swept display, as a tool for LIDAR scanning, as a tool for writing patterns for photolithography, and as optical excitation of multiphoton interactions in neurons The modulator will be used to create the first holographic video monitor that will be low cost and have a resolution and refresh rate comparable to current monitors as well as run from standard computer video signals.

The modulator may also be used to write a temporary or permanent pattern on light sensitive material and function as a hardcopy printer or a back end solution to a larger display system with a photosensitive front end that could have extremely large space bandwidth product and image depth. A multichannel device can modulate, for example, the red, green, and blue signals of a display in the same waveguide channel using a broadband tunable acoustic grating. Infrared may also be independently out-coupled in such a display to provide structured lighting for 3D capture. Such a device may be used as part of an elegant full-color holographic video display with integrated 3D camera optics for the integrated, holographic, 3D equivalent of a display with built-in webcam for use in next-generation telepresence and teleconferencing.

The modulator may also be used as a flat display. With the output out-coupled from the top or bottom face, a solid-state ultra-high resolution monolithic display is created. It may be used as part of a heads-up display, or mounted on glasses to project directly into the eye, possibly to help those with vision impairments, or as a very small, inexpensive, monolithic pico-projector. A waveguide pico-projector may be created that simultaneously modulates the phase, amplitude, and angle of multiple wavelengths of light in one or more waveguide channel(s) and uses tunable gratings instead of, or in addition to, the action of, a scanning mirror for less expensive and improved design and operation.

While preferred embodiments of the invention are disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims.

What is claimed is:

1. An anisotropic spatial acousto-optic modulator for a holographic display system, the modulator having an input end and an output end, the modulator comprising:
   a substrate;
   an anisotropic waveguide residing on the substrate, the waveguide being configured to guide light entering the modulator at the input end into a single polarization, the waveguide having a material composition and structure that can propagate at least red, green, and blue wavelengths of light without damage to the modulator; and
   at least one transducer disposed at or near the output end of the modulator, the at least one transducer being placed and configured to generate surface acoustic waves that propagate linearly with the guided, polarized light in the anisotropic waveguide, thereby creating a diffraction grating that converts at least some of the polarized light into a leaky mode of orthogonal polarized light at the modulator output end,
   wherein the modulator is edge-lit such that light is coupled into the modulator at an angle nearly collinear to the diffraction grating, and wherein the leaky mode of orthogonal polarized light exiting the modulator is scanned at an angle from the output end of the modulator into an optical path of the holographic display system for viewing at an angle that is nearly collinear to the diffraction grating.

2. The modulator of claim 1, wherein the substrate is selected from the group consisting of lithium niobate, lithium tantalite, and quartz.

3. The modulator of claim 1, wherein the waveguide is formed using at least one of proton exchange, titanium indiffusion, and ion implantation.

4. The modulator of claim 1, further comprising at least one coupling device at the input end of the modulator, the at least one coupling device being placed and configured to couple light into the anisotropic waveguide.

5. The modulator of claim 1, wherein the anisotropic waveguide has multiple channels.

6. The modulator of claim 1, wherein the guided polarized light is TE polarized light and the leaky polarized light is leaky TM polarized light.

7. The modulator of claim 1, wherein the guided polarized light is TM polarized light and the leaky polarized light is leaky TE polarized light.

8. The modulator of claim 1, wherein the surface acoustic waves are encoded with holographic information.

9. The modulator of claim 8, wherein the leaky mode emits a wavefront-modulated fan of light that exits one face of the substrate and forms part of a holographic image.

10. A holographic video display system comprising at least one anisotropic spatial acousto-optic modulator of claim 1, wherein the pattern of the surface acoustic waves is encoded with holographic information and acts as a holographic diffraction pattern that causes the modulator output to scan, focus, or form a wavefront that becomes at least part of a holographic image.

11. A holographic image produced by the system of claim 10.

12. A holographic video display system comprising at least one guided-wave anisotropic leaky-mode spatial acousto-optic modulator having an input end and an output end, wherein each modulator has a material composition and structure that can propagate at least red, green, and blue wavelengths of light without damage to the modulator, wherein each modulator is edge-lit such that light is coupled into the input end of the modulator at an angle nearly collinear to a holographic diffraction pattern that converts at least some of the light into a leaky mode of orthogonal polarized light at the modulator output end, and wherein the leaky mode of orthogonal polarized light exiting the modulator is scanned at an angle from the output end of the modulator into an optical path of the holographic video display system for viewing at an angle that is nearly collinear to the diffraction pattern.

13. The holographic video display system of claim 12, wherein a holographic image is formed by scanning the output of the modulator.

14. The holographic video display system of claim 12, each at least one guided-wave anisotropic leaky-mode spatial acousto-optic modulator further comprising:
   a substrate;
   an anisotropic waveguide residing on the substrate, the waveguide being configured to guide light entering the modulator at the input end into a single polarization; and
   at least one transducer disposed at or near the output end of the modulator, the at least one transducer being placed and configured to generate surface acoustic waves that propagate linearly with the guided, polarized light in the anisotropic waveguide, thereby converting at least some of the polarized light into a leaky mode of orthogonal polarized light at the modulator output end, wherein the surface acoustic waves are encoded with holographic information.

15. The holographic video display system of claim 14, wherein the modulator substrate is selected from the group consisting of lithium niobate, lithium tantalite, and quartz.

16. The holographic video display system of claim 14, wherein the waveguide is formed using at least one of proton exchange, titanium indiffusion, and ion implantation.

17. The holographic video display system of claim 14, the anisotropic modulator further comprising at least one coupling device at the input end of the modulator, the at least one coupling device being placed and configured to couple light into the anisotropic waveguide.

18. The holographic video display system of claim 14, wherein the modulator waveguide has multiple channels.

19. The holographic video display system of claim 18, wherein the holographic image is formed by scanning the output of the multiple-channel modulator waveguide.

20. The holographic video display system of claim 14, comprising multiple channels in multiple waveguides, and wherein each waveguide writes one or more lines of the holographic image.

21. The holographic video display system of claim 14, further comprising:
at least one light source adapted to provide one or more wavelengths of light;
a signal generator for providing the holographic information used for encoding the surface acoustic waves to the transducer;
a scanning subsystem for rendering a holographic image; and
an optical path for passing the diffracted light from the acousto-optic modulator to the vertical scanning subsystem.

22. A holographic video image produced using the video display system of claim 12.

23. A method for creating holographic images, comprising:
providing one or more wavelengths of light to a holographic video display system, the system comprising at least one guided-wave anisotropic leaky-mode spatial acousto-optic modulator having an input end and an output end, wherein each modulator has a material composition and structure that can propagate at least red, green, and blue wavelengths of light without damage to the modulator;
providing holographic information to the at least one anisotropic modulator for use in encoding surface acoustic waves, the encoded surface acoustic waves forming a holographic diffraction pattern;
coupling the light received at the holographic video display system into the at least one anisotropic modulator for diffraction by the surface acoustic waves according to the encoded holographic information, wherein each modulator is edge-lit such that light is coupled into the input end of the modulator at an angle nearly collinear to the holographic diffraction pattern and wherein the diffraction pattern converts at least some of the light into a leaky mode of orthogonal polarized light at the modulator output end; and
scanning the diffracted light output by the anisotropic modulator to form the holographic image, wherein the leaky mode of orthogonal polarized light exiting the modulator is scanned at an angle from the output end of the modulator into an optical path of the holographic video display system for viewing at an angle that is nearly collinear to the diffraction pattern.

24. The method of claim 23, the at least one anisotropic spatial acousto-optic modulator comprising:
a substrate;
an anisotropic waveguide residing on the substrate, the waveguide being configured to guide light entering the modulator at the input end into a single polarization; and
a transducer disposed at or near the output end of the modulator, the transducer being placed and configured to generate surface acoustic waves that propagate linearly with the guided, polarized light in the anisotropic waveguide, thereby converting at least some of the polarized light into a leaky mode of orthogonal polarized light at the modulator output end.

25. A holographic video display system that performs the method of claim 23.

26. A holographic image produced using the method of claim 23.

* * * * *